May 4, 1954 M. AUWÄRTER 2,677,715

OPTICAL-ELECTRICAL CONVERSION DEVICE COMPRISING A LIGHT-PERMEABLE METAL ELECTRODE

Filed Sept. 21, 1951 2 Sheets-Sheet 1

The Inventor:

Max Auwärter

May 4, 1954 M. AUWÄRTER 2,677,715

OPTICAL-ELECTRICAL CONVERSION DEVICE COMPRISING A LIGHT-PERMEABLE METAL ELECTRODE

Filed Sept. 21, 1951 2 Sheets-Sheet 2

The Inventor:
Max Auwärter

Patented May 4, 1954 2,677,715

UNITED STATES PATENT OFFICE 2,677,715

OPTICAL-ELECTRICAL CONVERSION DEVICE COMPRISING A LIGHT-PERMEABLE METAL ELECTRODE

Max Auwärter, Balzers, Liechtenstein, assignor to Dr. Alois Vogt, Vaduz, Liechtenstein Application September 21, 1951, Serial No. 247,704

Claims priority, application Switzerland September 23, 1950

21 Claims. (Cl. 136—89)

Optical-electrical conversion devices, such as blocking layer photoelectric elements and other light-responsive electric instruments comprise electrodes to take up the photoelectric current produced at the blocking layer upon the incidence of light and to feed such current to a circuit. At least one of the electrodes must be as permeable as possible for the incident light and still be a good electrical conductor. Previously it has not been possible to combine both properties to the desired degree.

Generally two different principal forms of light-permeable electrodes are known. In its first form the electrode consists of a fine metal mesh pressed against the surface of the light-sensitive layer. In this case the threads of the net, mostly consisting of metal wire, become points of attraction for the lines of potential emanating from them. The nonmetallically conductive gaps between the threads of the mesh form transverse electrical resistances which have the effect that the total conductivity of the electrode is small so that optical-electrical conversion devices thus constructed are of extremely low efficiency.

In its second form the electrode consists of a thin metal layer, preferably of gold, which is applied on the light-sensitive layer and in addition to being electrically conductive is light-permeable. Thick metal layers are good electrical conductors but only little light-permeable whereas on the other hand thin metal layers are highly light-permeable but poor conductors. The efficiency of such conversion device is relatively low in the first case owing to the attenuation of the incident light, in the second case owing to the high transverse resistance of the electrode.

A high transverse resistance of the electrode also involves a voltage drop within the electrode so that the relationship between the incidence of light and the photo-electric current produced generally is not linear. This disadvantage is considered a disturbance where a linear relationship between the incidence of light and the photoelectric current is necessary for a distortion-free control of a phenomenon in dependency on the incident light.

The resulting problem is solved by a construction of optical-electrical conversion devices based on optical-electrical conversion devices having a light-permeable metal electrode and characterized in that the electrode consists of a thin light-permeable metal layer and a screen arranged above said layer, the threads of which screen are good electrical conductors and are conductively connected with the metal layer.

By the resulting reduction of the transverse electrical resistance of the electrode the efficiency of the conversion device is critically increased and a linear relationship between the incidence of light and the photo-electric current results.

Preferably the screen may be a cross screen, having threads extending transversely to each other and being electrically conductively interconnected. To increase the light permeability of the electrode at least those portions of the light-permeable metal layer which lie between the threads of the screen may be covered on the surface facing the incident light with at least one dielectric, light-permeable cover layer, the thickness and refractive index of which are so determined that for a frequency in the middle of the range transmitted, amplitudes of incident light reflected at the boundary surfaces between cover layer and adjoining air and between cover layer and metal layer offset each other completely or almost completely by interference thus suppressing the total reflection.

An optical-electrical conversion device according to the invention may be constructed as follows:

A thin coherent metal layer is arranged, e. g. applied out of the vapor phase, on the light-sensitive layer, e. g., of a blocking layer photoelectric element. For high light-permeability this layer is so thin that in spite of a well conductive metal, such as gold, silver, copper, etc., being used it would have an inadmissibly high transverse resistance if it were to serve as an electrode alone. This metal layer has arranged directly on it a fine cross screen, the threads of which consist of metal, preferably of the same metal as the metal layer, and are electrically conductively connected with it whereas they are good conductors themselves. The mesh aperture of the cross screen may be, e. g., 0.1 mm., whereas the thickness of the threads of the screen is about 0.01 mm. Such screen does not appreciably affect the incidence of light but has a much reduced transverse electrical resistance. Owing to the conductive connection of all threads of the screen with the thin metal layer the same effect results as though this layer had a reduced transverse resistance itself, whereas it is highly light-permeable excepting a small absorption. From the technical standpoint a sufficiently fine screen can be manufactured without difficulty; this may be carried out with the methods and technical means mentioned hereinbefore.

To achieve a further increase of the light-permeability of the electrode described by suppressing the reflection of the incident light, that limiting surface of the thin metal layer facing the incident light is coated at least on the areas between the threads of the screen with a transparent dielectric cover layer, the thickness of which equals an odd multiple of one-fourth of the wavelength of incident light of a frequency lying approximately in the center of the range transmitted, as described more in detail in my copending application Ser. No. 247,703, filed simultaneously herewith. As a result, amplitudes of incident light reflected at the boundary surface between the air and the cover layer and between the cover layer and the metal layer will have a phase difference of half the wavelength outside the cover layer and, where the refractive index is correspondingly chosen, they will be equal in amplitude so as to offset each other by interference. For a light frequency corresponding to the mean frequency transmitted the removal is complete. However, for the entire visible spectrum it is still so large as to lead to a significant increase in effect. In virtue of the energy laws the thus achieved reduction of reflection leads to an increase in the permeability of the whole assembly so that practically only the absorption of the metal layer, small in itself, remains. For instance, where the metal layer consists of silver it is possible to achieve in this manner a maximum light recovery of approximately 90% in conjunction with a good conductivity of the electrode.

Consisting of a mechanically and chemically resistant material, the dielectric cover layer protects the thin metal layer and the light-sensitive layer against atmospheric influences. Thus the optical-electrical conversion device is given a high durability, the effect of this cover layer in this respect being similar to that achieved if the conversion device itself was accommodated in a high vacuum.

The cover layer may be applied out of the vapor phase on the electrode equipped with a screen already, and it makes no difference whether or not the layer covers also the threads of the screen.

The optical-electrical conversion device described, in addition to having a much higher efficiency than the previously known conversion devices, exhibits an almost perfectly linear relationship between the incidence of light and the photo-electric current produced.

The methods of manufacture to be applied in manufacturing optical-electrical conversion devices constructed according to the invention are characterized in principle thereby that an electrically well conductive screen is produced on the light-permeable metal electrode of the conversion device and that the screen is electrically conductively connected with the metal electrode. In the first place this can be effected by manufacturing the electrode and the screen independently and are then connected electrically conductively. This affords the possibility of an unrestricted choice of the material for both parts. Substantial simplifications, however, result when both parts are manufactured together, the metal electrode and the screen being made possibly from the same metal component, which may consist of the same metals, metal alloys, metal solid solutions, intermetallic compounds or the like. In particular the screen may be produced in a metal layer serving for forming the light-permeable metal electrode and screen by removing metal to the extent corresponding to the apertures of the screen, that is between the threads of the screen. On the other hand the screen may be produced or built up on the metal electrode. A suitable method consists in the application out of the vapor phase. In the co-pending application Ser. No. 218,883/51 there has been described in detail how methods of application out of the vapor phase, carried out in a vacuum, are suitable for producing in thin layers the recesses corresponding to the apertures of a screen or the built-up portions corresponding to the threads of a screen. By methods of application out of the vapor phase, moreover, the metal electrode can be produced, whether or not the screen is produced in the same vacuum. This does not exclude other suitable methods such as application in the form of dust, manufacture by cathode sputtering or production of the layers by chemical or thermal processes.

In further development of the inventive idea advantages can be achieved by producing on that limiting surface of the metal electrode which faces the incident light, at least to an extent corresponding to the apertures between the threads of the screen, a layer which consists of at least one dielectric and the refractive index of which is so chosen and its thickness so adjusted that for a frequency in the middle of the range transmitted, amplitudes of incident light reflected at the boundary surfaces between air and dielectric and between dielectric and metal electrode offset each other entirely or preponderantly. This can be achieved in that the thickness of the dielectric is dimensioned to amount to one fourth or an odd multiple of one fourth of the wavelength of incident light of a frequency in the middle of the range transmitted. Suitable refractive indexes are found in materials to be considered chemically and mechanically resistant dielectrics. This applies, e. g., to metal oxides, non-metal oxides such as silica ($SiO_2$) and silicon monoxide (SiO) also being suitable. Further to be mentioned are the metal sulphides such as zinc sulphide (ZnS). The metal fluorides such as magnesium fluoride ($MgF_2$) are also suitable, as well as the phosphides and similar compounds between metals, metalloids or gases. Obviously such dielectrics, which may also consist of mixtures of different oxides, different sulphides, different fluorides, or of mixtures of oxides and sulphides, oxides and fluorides, or the like, may be arranged not only on the free surface areas of the metal electrode between the screen threads but in addition thereto also on the screen threads themselves. Thereby the conversion device is given an increased efficiency owing to the complete or almost complete removal of reflection, and materials less resistant to the atmosphere than the noble metals from which the metal electrodes had so far to be made, may be used for manufacturing the screen. Where chemically and mechanically resistant, reflection reducing or reflection removing dielectric layers protect the metal electrode and, if desired, also the screen, electrically well conducting metals such as copper or copper alloys may be used, unless silver is used for building up the electrode and/or the screen instead of the formerly conventional gold.

The drawing shows examples of the invention in heavily enlarged, out-of-scale, diagrammatic sectional views taken through the photoelectric element of an optical-electrical conversion device.

Figure 1:
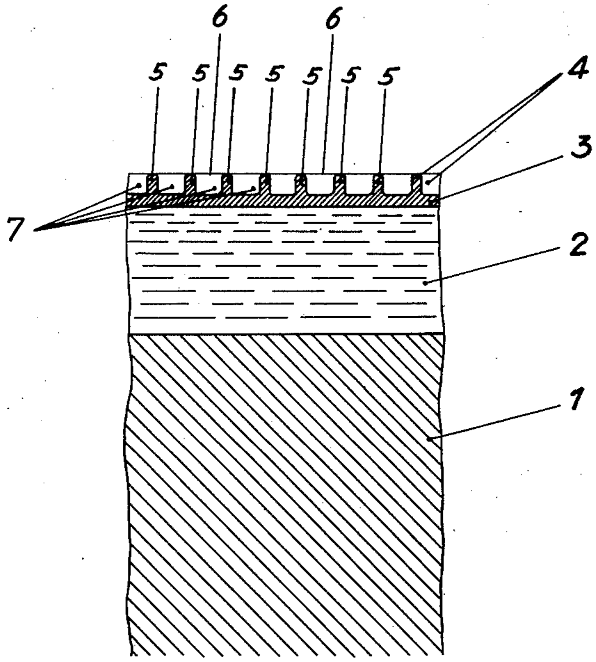
Fig. 1 is a section taken through a thin light-permeable metal layer applied on a photo-sensitive semiconductor, said layer being made from metal integral with the screen terminating the layer.
Figure 3:
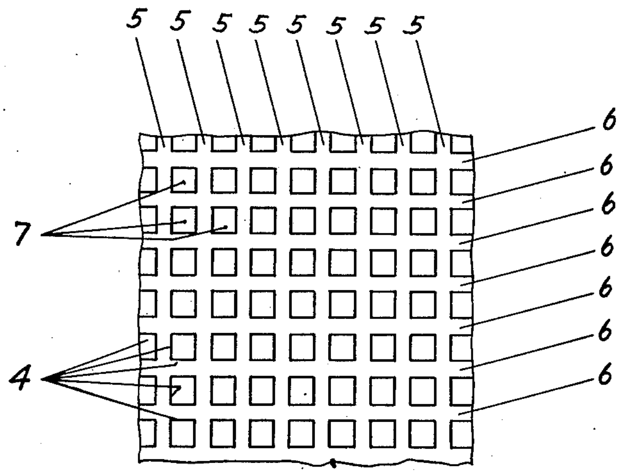
Fig. 3 is a top plan view of the reflection reducing or reflection removing layer of Fig. 2, said layer consisting of a dielectric.

In all figures 1 designates a base body consisting of suitable metals and carrying at 2 the photo-sensitive semiconductor. The thin, light-permeable metal layer 3, consisting, e. g., of gold or silver, is provided on the photo-sensitive semiconductor. This thin metal layer carries a screen 4, the pattern of which may be a cross pattern such as illustrated in Fig. 3, in which, e. g., the threads of the cross screen are at right angles with each other. Thus the arrangement shown in Fig. 1, as a photo-electric element, has the advantages explained in detail in the general statement of the invention.

Figure 2:
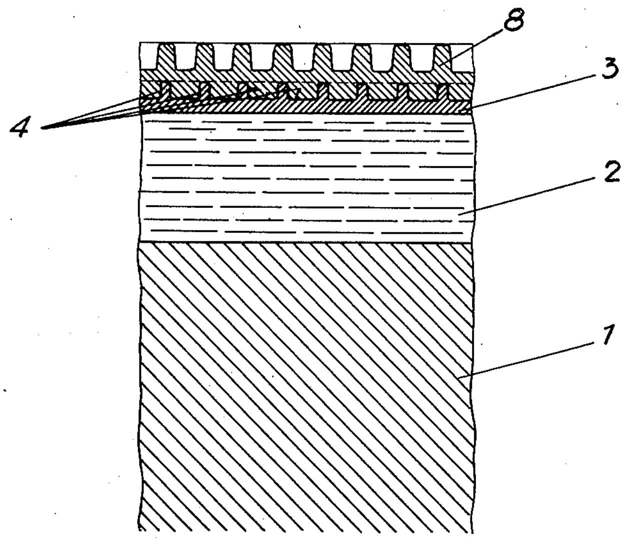
Fig. 2 is a similar section through a photoelectric element formed in accordance with Fig. 1, with the difference that a reflection-reducing dielectric is arranged on the screen.

The example shown in Fig. 2 corresponds to that shown in Fig. 1 with the difference that a reflection reducing or reflection removing layer 8 of a dielectric is applied on the screen 4. In the example shown in Fig. 2 this dielectric covers the threads 5 and the threads 6 as well as the apertures 7, but this is not absolutely necessary. It is sufficient to cover the apertures 7 of the screen 4 to achieve a substantial increase in the effect and efficiency of the photo-electric element. However, the application of a layer 8 of dielectrics covering the whole screen 4 is particularly simple and effective.

The dielectric 8 may consist of all mechanically and chemically resistant substances having a suitable refractive index. Particularly suitable are metal compounds, for instance, metal oxides, non-metal oxides such as silica ($SiO_2$) and silicon monoxide ($SiO$) being also suitable. Other suitable substances are metal fluorides such as magnesium fluoride ($MgF_2$), metal sulphides such as zinc sulphide ($ZnS$), phosphides, and other metal compounds.

The thickness of the layer 8 corresponds approximately to one fourth of the wavelength of incident light of a frequency in the middle of the range transmitted. The thickness may also correspond to one fourth of the wavelength of the incident light of a frequency in the middle of the range transmitted multiplied by any odd number. Thereby the light vectors produced at the boundary surfaces between the air and layer 8 and between the layer 8 and screen 4 more or less annihilate each other by the interference resulting from their superposition. Thus the reflection is reduced or removed as is desired. Moreover, the arrangement of the layer 8 of dielectrics has the advantage that it is no longer necessary to use previous materials such as gold and silver for building up the thin layer 3 and the screen 4 but other electrically well conducting materials such as copper or copper alloys may be used in 3 and 4. Moreover, the screen 4 can be made of other good electrical conductors if care is taken that the threads of the screen are well connected electrically with the metal layer 3 carrying them. However, the method of manufacture becomes particularly simple if the same material is used for building up 3 and 4.

The method of manufacture for the parts 3, 4 and 8 can be carried out in the most various ways. A particularly simple method consists in applying these layers from metals and dielectrics out of the vapor phase in a high vacuum. However, the layers may also be applied by in the form of dust, e. g., by cathode sputtering. Chemical and thermal methods of application are also suitable.

What I claim is:

1. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other.

2. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness of said dielectric being equal to an odd multiple of one fourth of the wavelength of incident light of a frequency lying approximately in the middle of the range transmitted, said dielectric consisting of chemically and mechanically resistant substances, the thickness and refractive index of said dielectric layer being so related to the refractive index at the electrode-dielectric layer boundary that for a frequency substantially in the middle of the transmitted spectral range, the amplitudes of incident light reflected from the dielectric layer and between the electrode and dielectric layers substantially completely extinguish each other.

3. An optical-electrical conversion device comprising, in combination, a light-permeable metal electrode, an electrically conductive screen, said screen being electrically conductively connected with said metal electrode, and at least one dielectric layer on the threads of said screen and on surfaces of the metal electrode lying between the threads, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other.

4. An optical-electrical conversion device comprising, in combination, a light-permeable metal electrode, an electrically conductive screen, said screen being electrically conductively connected with said metal electrode, and at least one dielectric layer on the threads of said screen and on surfaces of the metal electrode lying between the threads, the thickness of said dielectric being equal to an odd multiple of one fourth of the wavelength of incident light of a frequency lying approximately in the middle of the range transmitted, said dielectric consisting of chemically and mechanically resistant substances, the thickness and refractive index of said dielectric layer being so related to the refractive index at the electrode-dielectric layer boundary that for a frequency substantially in the middle of the transmitted spectral range, the amplitudes of incident light reflected from the dielectric layer and between the electrode and dielectric layers substantially completely extinguish each other.

5. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode consisting of silver.

6. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode consisting of a copper alloy.

7. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode consisting of copper.

8. An optical-electrical conversion device comprising, in combination, a light-permeable metal electrode, and an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode and said screen consisting of silver.

9. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode and said screen consisting of a copper alloy.

10. An optical-electrical conversion device comprising, in combination, a light-permeable metal electrode, an electrically conductive screen, said screen being electrically conductively connected with said metal electrode, and at least one dielectric layer on limiting surface areas of said electrode which limiting surface areas face the incident light and are situated at least between threads of the screen, the thickness and refractive index of said dielectric layer being so related to the refractive index at the electrode-dielectric boundary that for a frequency substantially in the middle of the spectral range transmitted, the amplitudes of incident light reflected at the boundary surfaces between air and dielectric and between dielectric and metal electrode to at least a large extent extinguish each other, said metal electrode and said screen consisting of copper.

11. A device as defined in claim 1, wherein the thickness of the cover layer is $a\lambda/4$, $a$ being an odd integer, and $\lambda$ being the wavelength at the said frequency.

12. A device as defined in claim 11, wherein $a=1$.

13. A device as defined in claim 1, wherein the metal electrode is composed of a member of the group consisting of copper and copper alloys.

14. A device as defined in claim 1, wherein the metal electrode is of gold.

15. A device as defined in claim 1, wherein the metal electrode is of silver.

16. A device as defined in claim 1, wherein the metal electrode is of copper.

17. A device as defined in claim 1, wherein the dielectric layer is composed of a member of the group consisting of silicon and metal oxides, metal sulphides, metal fluorides and metal phosphides.

18. A device as defined in claim 1, wherein the dielectric layer is a silicon oxide.

19. A device as defined in claim 1, wherein the dielectric layer is zinc sulfide.

20. A device as defined in claim 1, wherein the dielectric layer is magnesium fluoride.

21. A device as defined in claim 1, wherein the metal electrode is composed of a member of the group consisting of gold, silver, copper and copper alloys, and wherein the dielectric layer is composed of a member of the group consisting of silicon and metal oxides, metal sulphides, metal fluorides and metal phosphides.

References Cited in the file of this patent

UNITED STATES PATENTS

| Number | Name | Date |
|---|---|---|
| 2,000,642 | Lamb | May 7, 1935 |
| 2,104,483 | Hewitt | Jan. 4, 1938 |
| 2,310,365 | Hansell | Feb. 9, 1943 |
| 2,402,662 | Ohl | June 25, 1946 |
| 2,406,139 | Fink | Aug. 20, 1946 |

FOREIGN PATENTS

| Number | Country | Date |
|---|---|---|
| 51,940 | Sweden | Aug. 28, 1919 |
| 277,610 | Great Britain | May 29, 1923 |
| 560,652 | Great Britain | Apr. 13, 1944 |